Sept. 22, 1925.  R. MATTICE  1,554,361

METHOD OF REPAIRING CRACKED OR BROKEN STRUCTURES BY WELDING

Original Filed Oct. 3, 1924

Inventor
Royal Mattice
By Donald U. Rich
Attorney

Patented Sept. 22, 1925.

1,554,361

UNITED STATES PATENT OFFICE.

ROYAL MATTICE, OF BETHLEHEM, PENNSYLVANIA.

METHOD OF REPAIRING CRACKED OR BROKEN STRUCTURES BY WELDING.

Original application filed October 3, 1924, Serial No. 741,494. Divided and this application filed December 24, 1924. Serial No. 757,841.

*To all whom it may concern:*

Be it known that I, ROYAL MATTICE, citizen of the United States, residing at Bethlehem, in the county of Northampton and State of Pennsylvania, have invented certain new and useful Improvements in Methods of Repairing Cracked or Broken Structures by Welding, of which the following is a specification.

This invention relates to the method of repairing cracked or broken structures by welding and has particular reference to the repair of double-walled structures which are spaced from each other by webs, braces or the like. This application is a division of my copending application, method of repairing cracked or broken structures by electric welding filed October 3, 1924, Ser. No. 741,494.

While this invention has been practiced specifically in the repair of cracked or broken tops of hot blast stoves and the drawings show generally such a structure, it is obvious that the hereindisclosed method is adaptable for the repair of any double-walled structure, and I desire it understood that this invention is not restricted solely to the repair of hot blast stove tops and wherever mention is made of stove tops it is merely by way of example.

Metallic structures which are subjected to heat will crack from continual expansion and contraction and particularly is this true of hot blast stoves. Heretofore attempts have been made to repair the cracked structures by acetylene welding but it has been found that if the old crack did not reappear in the structure new cracks appeared adjacent the weld. Fire clay has been resorted to fill up the crack and a plate then clamped over the repaired surface by screws or the like. This method has proved unsatisfactory in practice.

In the case of hot blast stove tops, the type illustrated being doubled-walled, the upper and lower walls are separated by webs and braces and it has been found in practice that cracks appear adjacent the web and adjacent the brace.

It is one object of the present invention to provide a method for repairing the cracked stove tops when the same are cracked adjacent the web or brace.

It is a further object of the invention to provide a method for the repair of cracked double walled structures.

It is a still further object of this invention to provide a method for repairing cracked or broken hot blast stove tops.

Another object of this invention is to provide a method of repairing cracked or broken double-walled structures such as hot blast stove tops or the like by electric welding.

Other objects and advantages of this invention will be apparent from the following description taken in conjunction with the accompanying drawings, in which.

Figure 1:
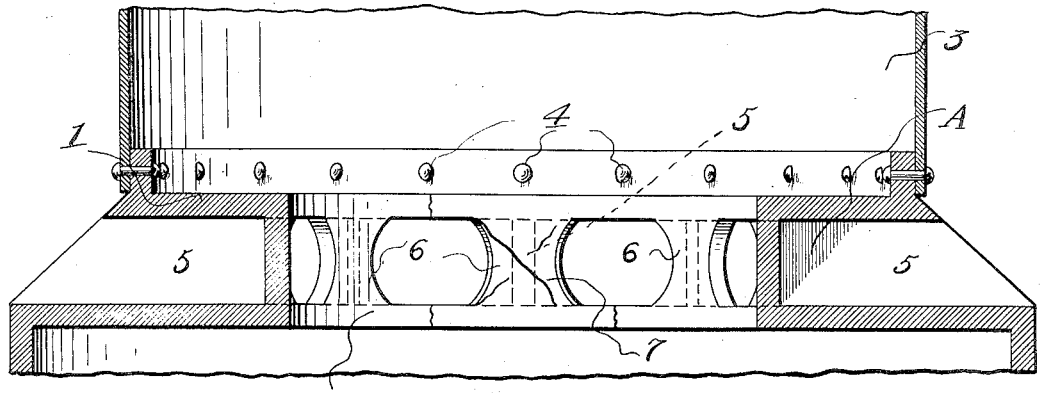
Figure 1 is a sectional view of a hot blast stove top.
Figure 2:
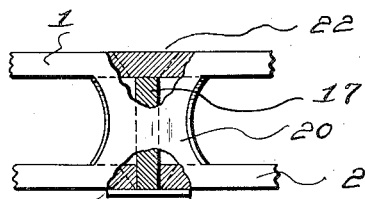
Fig. 2 is a fragmentary front elevation, partly in section, of a repaired portion of a stove top.

Referring now more particularly to the drawings, A designates a hot blast stove top in its entirety, the same comprising an upper section 1, a lower section 2 and a stack 3 the latter secured to section 1 by bolts 4 or the like.

The upper and lower sections 1 and 2 are spaced from each other a distance of approximately three inches, in stoves of present day usage, and the upper section 1 is supported by means of a plurality of webs 5, each provided with a brace 6. It is to be understood of course that both the sections 1 and 2 are provided with a central opening communicating with the stack 3 and that braces 6 are substantially arcuate in shape and are spaced each from the other circumferentially around the opening.

It has been found that due to expansion and contraction the upper sections 1 and 2 crack and also that braces 6 and webs 5 often crack.

The cracks above mentioned are designated at 7, indicating the cracks on a brace.

Figure 4:
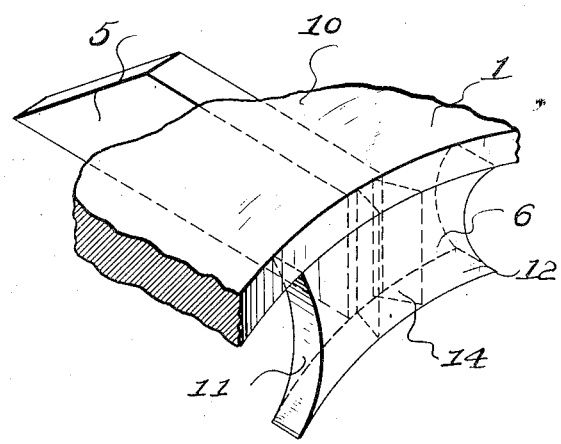
Fig. 4 is a perspective view of a portion of a stove top showing a web and brace forming a part thereof, the same having been repaired.

In repairing a cracked brace, a portion 10 of section 1 is removed just above the web, (see Figures 3 and 4) thus exposing the web 5. The brace 6 is then removed by any suitable method, for example, oxyacetylene.

Figure 3:
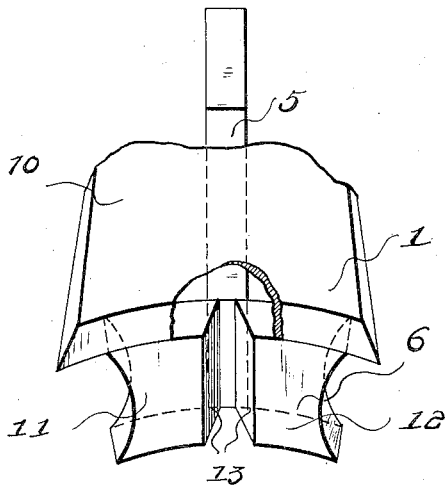
Fig. 3 is a perspective view of a portion of a stove top disclosing one of the steps in the method of repair.

I then provide an entirely new brace in two sections 11 and 12 respectively (see Figure 3), one edge of each section being tapered as shown at 13. The new brace is placed in position against the web 5 with the tapered edges facing each other but providing a space therebetween. As shown in Figure 3 the two sections 10 and 11 are placed in contact with the forward edge of the web 5 and when the elements are assembled as just described the sections 10 and 11 are then welded to the web 5, the finished article being shown more clearly in Figure 4 in which Figure 14 shows the weld. The portion 10 is then replaced and welded to the newly formed brace and to the web 5 thus forming an integral structure and effecting a complete repair of the previously cracked structure.

It often happens that the stove top is cracked adjacent the web 5 as well as the brace 6 and also the web 5, due to excessive expansion and contraction, also cracks. In either of these events, a portion of section 1 above the web is removed and the web and brace both removed. An opening is formed in section 2 and the edges of said opening are tapered as shown at 15. A pad 16 is then held against the lower face of section 2 covering the opening formed therein, and a new web 17 is supported in the opening on the pad 16. With the new web in position I then weld as shown at 18, thus uniting the section 2, pad 16 and web 19. A new brace 20 is then welded to the web 19 and sections 1 and 2 in a manner hereinbefore described and shown in Figures 3 and 4. Then as the final step in the repair of the structure by this method, the opening in section 1 above the web is welded as shown at 21. If sufficient metal has been removed from above the web to permit the replacement of the metal itself, such metal is welded back into position in the section 1, however in the repair of the structure just described it is usually necessary to remove only a small amount of metal in section 1 and in this event no new piece of metal need be welded to section 1 it being only necessary to fill up the opening by metal 22 by welding.

It has been found more practical to carry out the method just described by electric welding as the degree of heat necessary to effect a practical weld can be controlled with greater accuracy than can heat of any other welding process and a far more efficient weld is thus obtained.

From the above description it is believed that the method will be obvious to those skilled in the art but I desire it understood that the drawings are merely by way of example and that the herein described method of repair is applicable generally to any metallic double-walled structure in which the walls are separated by means of braces or webs or both. It is further to be understood that various changes may be made within the scope of the appended claims without departing from the spirit of the invention.

What I claim as my invention and desire to secure by Letters Patent is:

1. The method of repairing cracked or broken stove top braces which comprises removing a portion of the upper wall of the stove top, removing the cracked or broken brace, placing a new brace in position and welding the same to said stove top, replacing the portion previously removed from the upper wall, and finally welding said portion to said upper wall and to said brace.

2. In a stove top having double walls and webs and braces separating and supporting the same, the method of repairing cracked or broken braces which comprises, removing a portion of the upper wall above the cracked or broken brace, removing the cracked or broken brace, forming a new brace in two sections, welding said sections to said lower wall and said web to form a unitary structure of said brace, lower wall and said web, and finally welding the portion previously removed from said upper wall back in position in said upper wall and to said web and brace.

3. In a stove top having double walls and webs and braces separating and supporting the same, the method of repairing cracked or broken webs and braces which comprises, removing a portion of the upper wall above the cracked or broken web and brace, removing the cracked or broken brace, removing the cracked or broken web, forming an opening in the lower wall, securing a pad against the lower face of the lower wall, positioning a new web between the upper and lower walls, with the lower edge thereof in said opening, welding said web to the lower wall and to said pad, forming a new brace and positioning the same against said web, welding said brace to said web and lower wall, and finally welding the portion previously removed from said upper wall back in position in said upper wall and to said web and brace.

In testimony whereof I affix my signature.

ROYAL MATTICE.